Sept. 14, 1937.  H. CASLER  2,093,032
CAMERA
Filed Dec. 21, 1935  3 Sheets-Sheet 1
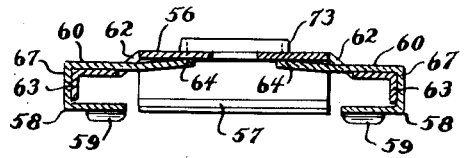
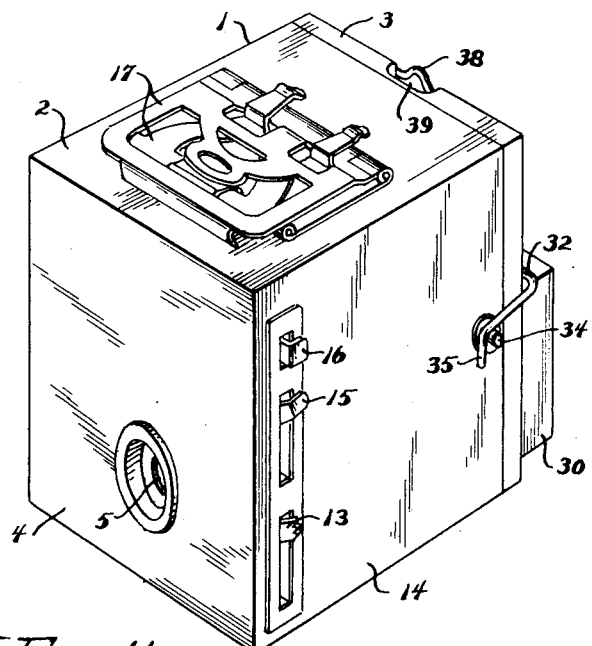
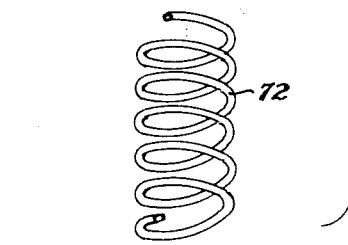
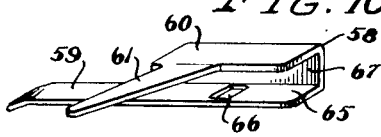
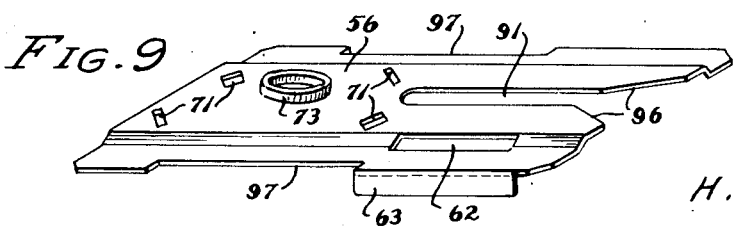
Inventor
H. CASLER
By Robert Cobb
Attorneys Sept. 14, 1937. H. CASLER 2,093,032
CAMERA
Filed Dec. 21, 1935 3 Sheets-Sheet 2
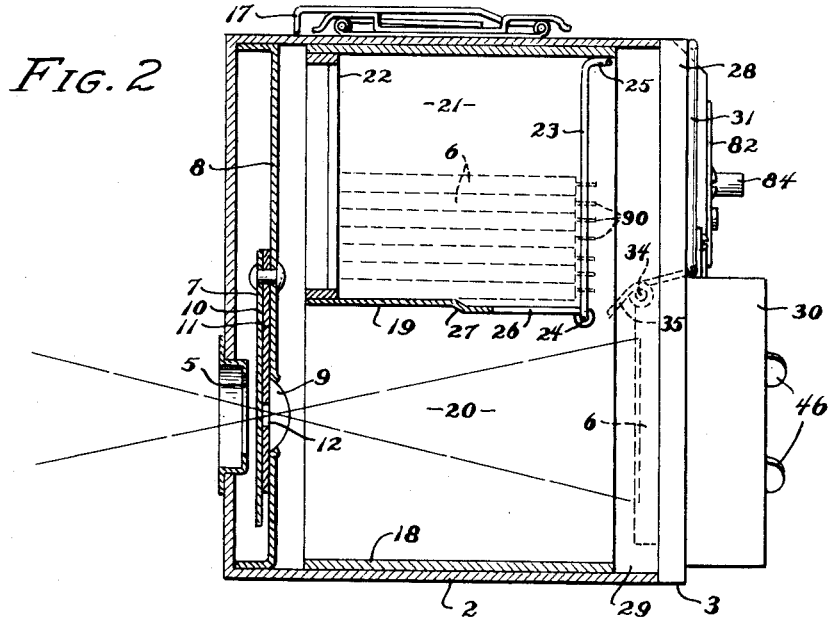
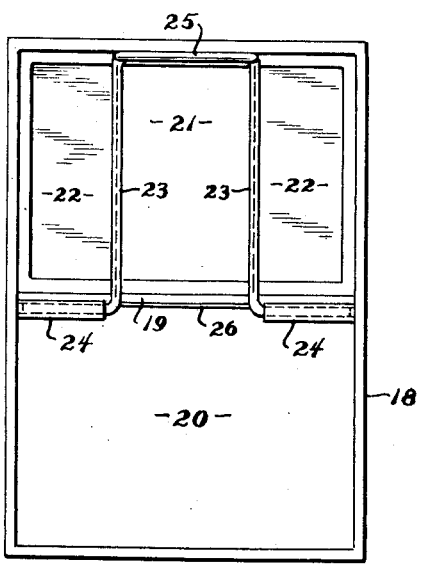
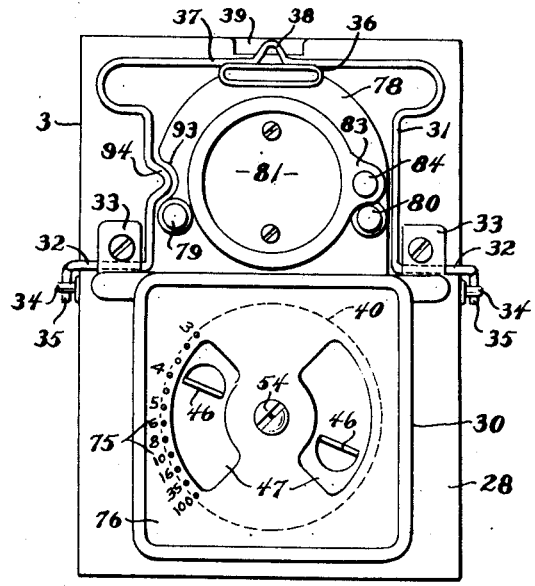
Inventor
H. CASLER
By Robb & Robb
Attorneys Sept. 14, 1937.  H. CASLER  2,093,032
CAMERA
Filed Dec. 21, 1935  3 Sheets-Sheet 3
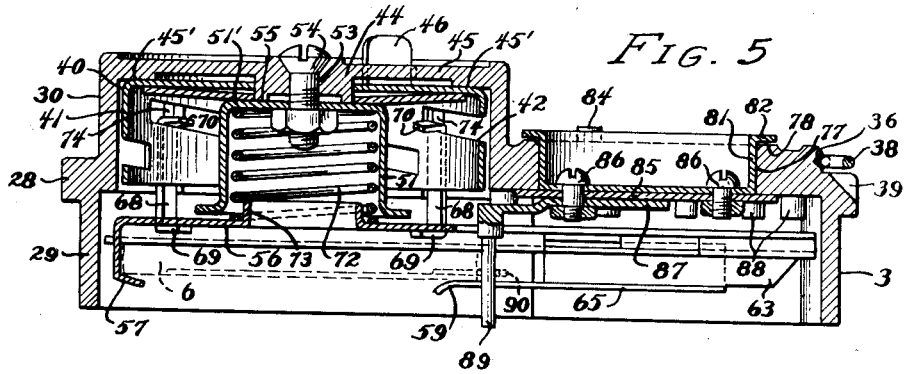
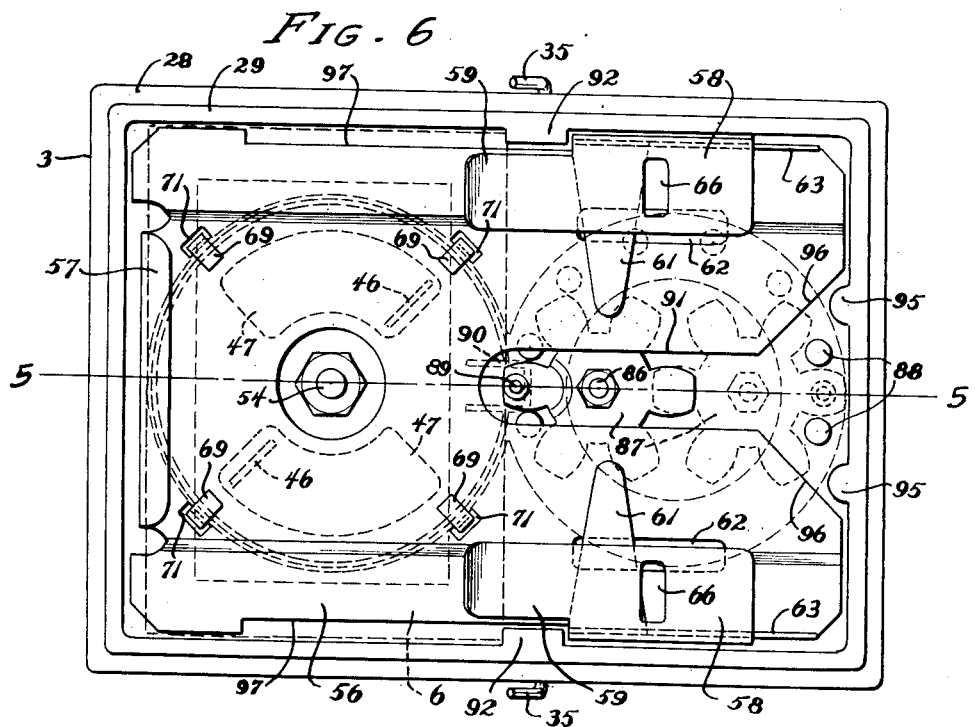
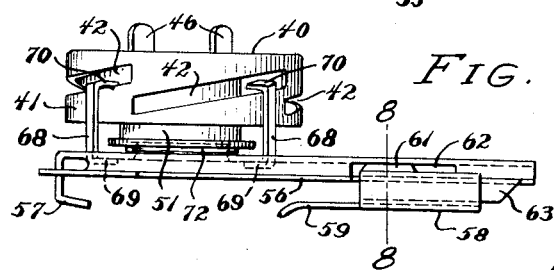
Inventor
H. CASLER
By Robbs+Cobb
Attorneys Patented Sept. 14, 1937

2,093,032

UNITED STATES PATENT OFFICE 2,093,032

CAMERA

Herman Casler, Canastota, N. Y.

Application December 21, 1935, Serial No. 55,649

16 Claims. (Cl. 95—19)

This invention appertains to cameras, and more particularly to camera constructions for use with my special film packs disclosed in my copending application Serial No. 51,164, filed November 22, 1935. In that case, and in my earlier copending application Serial No. 12,644, filed March 23, 1935, entitled "Method of and apparatus for treating photographic pictures", I have disclosed a new type of picture pack of the so-called "single shot" character, embodying a holder for a photosensitized element and a movable shutter cooperating with said holder to permit masking or exposing the photosensitized element at will. These picture or film packs have been primarily designed for amateur use, and it has been my aim to provide a complete set of photographic equipment of simple and inexpensive character, whereby to encourage and promote the taking of pictures. In other words, it is my desire to make available to the public a complete photographic outfit which may be produced for sale at relatively low cost, and utilized to great advantage for the various operations attendant upon making up a photograph. This is preferably accomplished without the aid of commercial photographers, whose developing services usually involve considerable expense. The camera of the present application has been primarily developed as an important part of the photographic outfit above mentioned, and is capable of conjoint use with the other parts of such outfit as will more fully appear by reference to the aforementioned copending applications.

One of the primary objects of the present invention is to provide an improved focusing means for cameras, and particularly, a novel focusing mechanism adaptable to my new picture pack.

A still further object of the invention is to provide in a camera, a support for holding the picture pack in position during exposure of the light-sensitive element of the pack, the support being preferably adjustable to permit focusing of the image according to the distance the camera is from the subject.

Another object of the invention is to provide in a camera, focusing mechanism of unitary form and preferably composed of elements of relatively inexpensive construction, as for example, metal stampings.

A further object of the invention is to provide a picture pack supporting head adaptable to cameras of the so-called "box" type, wherein the head forms a mounting for the focusing instrumentalities and for the mechanical instrumentalities for actuating the shutter which forms a part of the picture pack.

Other and further objects and advantages of the invention will be hereinafter described, and the novel features thereof defined by the appended claims.

In the drawings:—

Figure 1 is a perspective view of a camera embodying the principal features of my invention;

Figure 2 is a vertical sectional view, taken approximately on a plane passing centrally through the camera of Figure 1, the picture pack supporting head being shown in elevation;

Figure 3 is a rear end elevation of the camera, showing the outer face of the picture pack supporting head and certain of the instrumentalities carried thereby;

Figure 4 is a view in end elevation of the inner picture pack magazine or pack storage holder;

Figure 5 is a sectional view, taken approximately on the line 5—5 of Figure 6, and particularly illustrating the focusing mechanism and the shutter actuating instrumentalities;

Figure 6 is a plan view of the picture pack supporting head shown in Figure 5, looking towards the inner face thereof;

Figure 7 is a view in side elevation of the focusing unit shown particularly in section in Figure 5;

Figure 8 is a sectional view, taken approximately on the line 8—8 of Figure 7;

Figure 9 is a perspective view of the picture pack supporting plate which forms a part of the focusing unit;

Figure 10 is a perspective view of one of the adjustable clips adapted to coact with the plate of Figure 9 for holding the picture pack; and Figure 11 is a composite perspective view of certain of the parts of the focusing mechanism, arranged in the order of their assembly, the parts being separated to more clearly disclose the details thereof.

Like reference characters designate corresponding parts in the several figures of the drawings.

As shown in Figure 1, the camera, generally designated 1, comprises a casing 2 of substantially box-like form, having its rear end open for receiving the picture pack carrying head, or supporting frame 3. The front face 4 of the casing 2 is provided with an opening 5, through which the light is admitted when the photosensitized element of the picture pack 6 is exposed under the control of a shutter unit, generally designated 7. The shutter unit may be of any desired construction, and as shown more or less diagrammatically in Figure 2, embodies a frame 8 in which the lens 9 is mounted so as to be disposed in alignment with the opening 5. The shutter is designated 10, and is disposed on the frame 8 so as to be normally interposed between the opening 5 and the lens 9, whereby to prevent the light from passing to the picture pack 6 until such time as it is desired to expose the photosensitive element of the pack. The shutter unit 7 also preferably includes a diaphragm 11, having a plurality of openings 12 therein of different sizes arranged for selective registration with the lens 9 and opening 5 so as to control the amount of light admitted into the camera, as will be readily understood by those skilled in the art. Inasmuch as these elements of the shutter unit may be of conventional construction, further detailed description thereof is unnecessary. It will be understood that suitable controls are provided for permitting actuation of the shutter 10 and adjustment of the diaphragm 11. The shutter actuating member or trip is designated 13 in Figure 1, and projects through one of the side walls 14 of the camera case 2 in the customary manner. 15 designates a control lever or arm for selectively adjusting the diaphragm 11, so that the proper sized opening therein may be shifted into register with the lens according to the light conditions under which the picture is being taken. I also preferably provide a member, designated 16, for adjusting the shutter control mechanism, whereby to permit so-called "time" exposures.

If desired, the camera may be provided with a suitable finder, and I have shown in Figure 1 an improved type of collapsible finder, generally designated 17, the details of which are immaterial in the present case.

Referring now particularly to Figures 2 and 4, there is mounted within the casing 2, an inner box-like member, or insert generally designated 18, this member having the general shape of the casing 2, but being slightly smaller so as to telescope into the casing 2. This telescoping fit is preferably such that the member 18 is held in position by frictional engagement with the inner surfaces of the walls of the casing 2 when inserted into the latter. The member 18 thus constitutes an insert which may be removed from the casing if desired. This insert 18 is provided with a partition 19 mounted transversely thereof intermediate its upper and lower sides, thereby forming a light passage 20 intermediate the lens 9 and the picture pack 6 which is carried by the head 3. The upper portion of the insert, above the partition 19, is preferably utilized to store extra picture packs, as shown in dotted lines in Figure 2. After a picture pack has been exposed in taking a picture, a fresh or unexposed pack may be taken from the storage compartment 21 and mounted in the head 3 so as to condition the camera for taking another picture. The exposed packs may be temporarily replaced in the storage compartment 21 until such time as they are to be developed, if desired. The front end of the storage compartment 21 is preferably closed, or substantially closed, as by means of bottom wall 22, thereby forming a seat against which the packs 6 engage when the head 3 of the camera is removed to permit introduction of the packs into the storage compartment or magazine. A bail-like member 23 is hingedly connected to the rear end of the partition 19, as at 24, so as to permit the same to be swung into a position as shown best in Figure 2, over the ends of the packs 6 in the storage compartment to prevent the packs from becoming accidentally displaced. The end 25 of the bail-like member 23 is bent rearwardly so as to be engaged by the head 3 at the upper end of the latter when the head is attached to the casing 2. This engagement insures that the stored packs must be properly seated in the storage chamber 21 or magazine before the head 3 can be mounted on the casing 2. To remove one of the packs stored in the compartment 21, it is only necessary to remove the head 3 from the casing 2 and swing the bail-like member 23 rearwardly (or upwardly if the camera is held with the open end uppermost). The partition plate 19 is preferably provided with a recess 26 to facilitate the grasping of a picture pack in the compartment 21 in withdrawing a pack therefrom, and to further facilitate such withdrawals or insertions, the partition plate is offset, as at 27, so as to permit the stored packs to be spread apart slightly at the ends which are disposed towards the open end of the camera casing.

The casing 2 and the insert 18 may be constructed of a relatively heavy cardboard, inasmuch as such material is inexpensive and has been found to be admirably suited for these purposes. As the head 3 is somewhat irregular in form, it is preferably composed of "Bakelite" or some other composition of an inexpensive nature which may be molded or cast readily. It is to be understood, however, that I do not wish to be limited to the use of the foregoing materials.

The construction of the head 3 and the instrumentalities carried thereby will now be described. The body 28 of the head is substantially rectangular to conform with the configuration of the casing 2, and there extends from the body a marginal flange 29 adapted to fit closely within the open end of the casing 2. On the opposite side of the body is a hollow, integral, protuberant extension 30, which substantially serves as a housing for certain of the parts of the focusing mechanism later to be described. Any suitable means may be employed for removably securing the head 3 to the casing 2, and for this purpose, I have found that the bail-like member 31, best shown in Figure 3, works very well, and is quite simple in construction and relatively inexpensive to produce. This member 31 may be formed of wire of suitable stiffness which may be bent to provide outwardly extending arms 32 disposed so as to bear upon the outer face of the body 28 of the head 3. Brackets 33, secured to the head so as to overlie the arms 32 of the bail-like member 31, secure the arms 32 to the head while permitting a swingable movement of the member 31 about the axis of the arms 32. The outer ends of the arms 32 are respectively bent over the sides of the head 3, and are extended sufficiently far beyond the head as to be capable of engaging the studs or pins 34 mounted on the sides of the casing 2. The free ends 35 of the arms 32 are bent at an angle so that engagement of the arms with the pins 34 will prevent removal of the head 3 from the casing. When the arms are so engaged, the bail-like member 31 lies substantially flat against the head 3, as best shown in Figures 2 and 3. A shallow groove 36 is provided in the head so that the transversely extending portion 37 of the bail-like member 31 may be sprung or snapped into the groove 36 to hold the member 31 in a substantially flat position against the head with the ends 35 of the arms 32 slightly tensioned against the pins 34. When the bail-like member 31 is so positioned, the head 3 is firmly fastened to the casing 2. The portion 37 is preferably provided with a loop-shaped offset 38, and the head is recessed at 39 adjacent the offset 38 so as to facilitate springing the ball-like member out of the groove 36 in swinging the same rearwardly to release the arms 35 from the pins 34 and permit removal of the head 3 from the casing 2. In other words, the ball-like member may be swung to head-releasing position by inserting a finger under the offset portion 38, which constitutes a finger piece, and exerting a pressure on the finger piece sufficiently great to cause the portion 37 to snap out of the groove 36. Thereafter, the ball-like member 31 may be swung more freely about the axis of the arms 32 until the arms 35 have been swung sufficiently far away from the pins 34 as to permit the head to be completely removed from the casing. The pins 34 are preferably so positioned that the head can only be clamped or secured to the casing if applied thereto in the proper relation, inasmuch as the picture pack is adapted to be mounted within the head towards one end, and this end must be positioned so that the picture pack will be located at the rear of the light passage 20, that is, directly opposite the lens 9 and the opening 5. By disposing the pins 34 on the casing so as to be located at unequal distances from the top and bottom respectively of the camera, the head can only be secured to the casing when the picture pack is correctly positioned respecting the lens and light chamber. Accidental reversal of the head will be readily apparent, inasmuch as the head cannot be secured to the casing if it is placed on the casing incorrectly. It is to be understood that I do not wish to be limited to the use of the particular securing means just described, as other means for fastening the head to the casing may be utilized if preferred.

*Focusing unit*

Mounted within the hollow protuberant extension 30 of the head 3 is a cam member 40 of substantially cup-shaped form, the annular flange 41 of which is provided with a series of cam slots 42 displaced ninety degrees from each other about the cam 40. An opening 43 is provided in the end wall of the cam member for receiving the integral boss 44 projecting into the recess or cavity in the extension 30 from the end face 45 thereof. Finger pieces 46 are struck out of the end wall 46' of the cam member 40 so as to afford a convenient means for rotating the cam member about the boss 44 as an axis, the finger pieces projecting outwardly from the end of the head through suitable arcuately arranged openings or slots 47 formed in the end wall 45 of the extension 30. The inner face of the wall 45 is provided with an annular shoulder 45' against which the cam member seats. It will be observed that this annular shoulder 45' forms a bearing surface of comparatively small area, and hence produces only a very little friction in its contact with the cam member when the latter is rotated.

Within the cam member 40 is disposed a plate 48, having substantially the form of a washer, which is bent at 49 on its diameter to provide angularly disposed portions affording contact with the cam member at opposite sides thereof, as best shown in Figure 5. This plate 48 is provided with an aperture 50, through which the boss 44 is adapted to extend.

Mounted within the cup-shaped cam member 40, is another cup-shaped member 51 disposed in coaxial relation with the cam member 40 and with the plate 48. The end wall 51' of this inner cup member 51 is provided with an aperture 52 adapted to register with a corresponding aperture 53 in the center of the end wall 45 of the extension portion 30 of the head, this last mentioned aperture extending through the boss 44. A bolt, rivet, or the like, 54, is inserted through the openings 53 and 52 for securing the cam 40, plate 48 and cup member 51, in position within the head. The plate 48 is preferably resilient, and is bent on the line 49 in an amount sufficient to exert a yieldable pressure, respectively on the inner face of the end wall 46' of the cam 40 and on the outer face of the end wall 51' of the cup member 51 when the latter is drawn tightly against the end 55 of the boss 44 by means of the bolt or rivet 54. By reason of this arrangement of the parts just described, the cam member will be always urged towards its seat formed by the annular shoulder 45', but is free to turn on the boss 44 with a smooth and easy action. The yieldable pressure of the pressure plate or washer 48 serves to maintain the cam member in a stationary position after it has been rotatably shifted to any of the various positions to which it may be adjusted through manipulation of the same by the finger pieces 46. Connected with the cam member 40 is a plate, generally designated 56, having the form substantially as illustrated in Figure 9. This plate is adapted to receive one of the picture packs 6 previously referred to, and constitutes a support for the pack 6 when the same is loaded in the camera for taking a picture. One end of the plate is provided with a substantially U-shaped flange 57 for receiving therein the rear edge of the picture pack. A pair of adjustable clip members, generally designated 58, are mounted on the plate 56 adjacent the opposite end, these clip members 58 being provided with fingers or tongues 59 extending towards the flange 57 so as to engage over the forward edge of the picture pack 6 adjacent to the opposite sides of the latter. In other words, the picture pack 6, as illustrated in dotted lines in Figures 5 and 6, is adapted to be mounted upon the plate 56 on the side of the latter opposite to the cam member 40 previously described, and the pack is held in position by means of the flange 57 and the adjustable clips or slides 58. Each of the clip members 58, as best seen in Figure 10, is substantially U-shaped in transverse cross-section, and one side, 60, thereof, is provided with a laterally extending tongue 61 adapted to be received within one of the slots 62 provided in the plate 56, there being two such slots, one at each side of the plate. The sides of the plate 56 adjacent the slots 62 are flanged, as at 63, to provide a bearing surface for the corresponding side of the clip 58 when the latter is mounted on the plate 56 with the tongue 61 inserted through the slot 62, as best illustrated in Figure 8. The tongue 61 is preferably inclined slightly, as seen in Figure 8, respecting the side 60 of the clip, so that it exerts a yieldable pressure against the inner face of the plate, as at 64, it being understood that the clips 58 are each made of resilient material such as relatively thin spring metal. The side 65 of each clip, from which the fingers 59 extend, as a continuation thereof, is provided with an aperture 66 into which the tip of the finger may be inserted to manipulate the clip backwardly and forwardly along the slot 62, whereby to selectively engage the clip with, or disengage the clip from, the pack 6, as will be obvious from reference to the drawings. In assembling the clips 58 onto the plate 56, the tongues 61 are respectively inserted through the slots 62 and the clips are pressed towards the flanged edges of the plate until the side walls 67 of the clips respectively engage the flanges 63 of the plate, as shown in Figure 8. These flanges 63 assist in guiding the clips as they are shifted relatively to the plate towards and away from the pack-engaging position. Inasmuch as the plate 56 and the clips 58 are virtually housed within the head 3, the clips will not become displaced laterally from the plate, especially since the flange 29 of the head surrounds the plate and the clips, as will be seen in Figures 5 and 6.

For the purpose of connecting the plate 56 with the cam 40, I provide a plurality of links 68, having their opposite ends 69 and 70 bent substantially at right angles to the intermediate portions thereof. These links are equally spaced about the cam member 40, and their ends 70 extend inwardly through the slots 42, there being one link for each slot. The opposite ends, 69, of the links pass through apertures 71 provided in the plate 56 and engage the inner face of the plate in the manner shown particularly in Figures 5 to 7, inclusive. The ends 70 of the links 68, which project through the slots 42 of the cam 40, are given a slight twist so as to assume substantially the inclination of the slots. This produces a broader bearing surface between the edges of the cam slots and the ends 70 of the links, contributing to the smooth and easy action of the cam. A spring 72 is interposed between the rear face of the plate 56 and the end face of the cup member 51, the latter substantially housing the spring. The plate 56 is preferably provided with a spring-centering collar 73, projecting from the side of the plate towards the open end of the cup member 51. The spring normally urges the plate 56 and the pack 6, carried thereby, in a direction away from the cam 40, but this movement is limited by the links 68. By rotatively shifting the cam 40, the plate 56 is caused to move in a direction at right angles to the general plane of the head, that is, towards and away from the lens 9 in the camera casing 2. Recesses or grooves 74, formed in the inner walls of the protuberant extension 30 of the head 3, receive the links 68 so as to hold the latter against rotative shifting about the axis of the cam 40 when the cam is manipulated to set the pack-carrying plate 56 for the desired focus corresponding to the distance the subject is away from the camera when taking a picture. However, the links are permitted to move lengthwise in the grooves 74 as the cam 40 is turned about its axis. Cam slots 42 are respectively inclined, as best seen in Figures 7 and 11, and because of this inclination, the plate 56, carrying the picture pack 6, is shifted rearwardly against the force of the spring 72 when the cam 40 is rotated in one direction, and the spring 72 urges the plate 56 and the links 68 forwardly when the cam 40 is rotated in the opposite direction. Since the cup 51 is tightly clamped against the face 55 of the boss 44, by the screw or rivet 54, as the case may be, it cannot rotate, and hence there will be substantially no torsional strains applied to the spring 72 as the cam 40 is rotated in one direction or the other. In other words, there is no tendency for the spring to wind up or unwind during the focusing operation, and the desired focal setting can be effected very readily through a simple manipulation of the cam member by the finger pieces 46. The outer face of the head is preferably provided with suitable indicia, generally designated 75, adjacent to one of the openings 47 through which the finger pieces 46 project, and these indicia serve to indicate the focal setting, as will be readily understood by those skilled in the art. If desired, the indicia may be in the form of figures representing units of distance such as, for example, feet. The figures and graduations may be formed on or in the outer face 76 of the protuberant extension 30 during the molding or casting of the head 3, if desired.

*Picture pack shutter-actuating mechanism*

Each picture pack 6 includes a shutter which is shiftable to and from a position across the face of the photosensitive element in the pack. For a more complete disclosure of the details of the pack, reference may be had to my copending application Serial No. 51,164, previously referred to. It will be understood that the pack shutter is disposed within the pack when the pack is being handled during the camera loading operation, preparatory to taking a picture. This is to prevent the photo-sensitive element of the pack from being inadvertently exposed to light until the camera is made ready for taking a picture. After the pack has been loaded in the camera, that is, mounted upon the plate 56, as illustrated herein by the dotted lines in Figures 5 and 6, it is necessary to withdraw the shutter from the pack so that the photosensitive element may be exposed under the control of the camera shutter 10. This withdrawal of the pack shutter is accomplished while the pack is enclosed within the camera, that is, after the head 3 has been mounted on, and secured to, the end of the casing 2. The means for actuating the pack shutter may be the same or similar to the shutter-actuating means disclosed in my copending application Serial No. 12,644. To apply such means to my camera, the head 3 is provided with a cylindrical bore or opening 77 in its upper portion above the protuberant extension 30, and this bore 77 is surrounded by a raised annulus 78. Stop lugs 79 and 80, projecting outwardly from one side of the head adjacent to the bore 77, are provided for purposes which will hereinafter become more apparent.

A rotary cup-shaped member 81 is journaled in the bore 77 to extend therethrough, and has its upper end provided with an outturned annular flange 82 bearing upon the outer face of the annulus 78 to hold the member 81 against relative inward displacement. The flange 82 is extended laterally at 83 and carries a finger piece or handle 84, as shown best in Figure 3. The bottom of the member 81 is disposed substantially flush with the inner end of the bore, as best seen in Figure 5, and a flat circular disc 85 of greater diameter than the bore 77 is secured by bolts 86, or other suitable fastenings, to the bottom of the cup member 81, coaxial therewith, to extend radially beyond the bore 77 for engaging the underside of the body of the head, thereby preventing outward displacement of the member 81 without interfering with the free rotation thereof through manipulation of the handle 84 when desired.

A planetary gear wheel 87 is journaled upon or pivoted to the disc 85 some distance to one side of the axis of the disc (said axis coinciding with the axis of the member 81). One of the bolts 86 may be utilized to mount the gear wheel 87 upon the disc 85, and it is to be understood that the gear wheel is freely rotatable on the bolt. A series of relatively fixed studs or pins 88 project from the inner face of the body of the head 3, and are disposed in circumferentially spaced relation about the axes of the concentric members 81 and 85 so as to be engaged by the teeth of the planetary gear wheel 87. One of the teeth of the gear wheel is provided with a pin 89 adapted to engage in a staple or tongue 90 on the front edge of the shutter which forms a part of the picture pack 6.

The teeth of the planetary gear wheel 87 and the studs or pins 88 are arranged in such relation that when the members 81 and 85 are rotated one-half revolution, the pin 89 on the gear wheel will be moved rectilinearly and diametrically across the disc 85, thus converting the rotary motion of the members 81 and 85 into a rectilinear motion of the pin 89 and the shutter connected with the pin through the staple or tongue 90.

Inasmuch as the members 81, 85, and 87, constituting the principal elements of the shutter-actuating mechanism, are mounted on the head on the opposite side of the plate 56 upon which the picture pack 6 is mounted, the plate 56 is slotted at 91 so that the pin 89 may engage in the tongue or staple 90 of the pack shutter, and move rectilinearly, as previously described, in opening and closing the shutter. Preferably, the shutter is not withdrawn all the way out of the pack 6 when it is desired to expose the photosensitive element of the pack for taking a picture, because after the exposure, it is my desire to mask the photosensitive element, that is, by shifting the shutter into the pack and across the photosensitive element, so that the pack 6 can be removed from the camera in daylight and transferred to suitable developing instrumentalities, as for example, a developing device as disclosed in my previous application Serial No. 12,644. Furthermore, it may be desired to take several pictures before any of the packs are developed, so that by actuating the shutter to its closed position, the exposed pack may be removed from the head and conveniently stored in the compartment 21 within the body of the camera until such time as it is desired to develop the same, and while taking other pictures.

To prevent the pack 6 from shifting lengthwise of the plate 56 during withdrawal of the pack shutter by the actuating instrumentalities just described, I provide abutments or lugs 92 within the head 3, which are so located as to engage the front edge of the pack 6 at opposite sides of the pack shutter. As best shown in Figure 6, these lugs or shoulders 92 are formed integrally with the flanges 29 of the head 3 and project a short distance transversely of the head in opposite directions. The shutter is narrower than the distance between the lugs 92, so that it may be freely withdrawn from the pack 6 by actuation of the shutter-operating instrumentalities. It will be understood that the cup-shaped member 81 is rotated by means of the handle or finger piece 84 in one direction to open the pack shutter, and is rotated in the opposite direction to close or return the pack shutter to a position masking the photosensitive element of the pack. The stop lugs 79 and 80 on the exterior face of the head 3 limit the rotation of the member 81, as will be obvious from the foregoing description.

Means is preferably provided to prevent removal of the head 3 from the casing 2 of the camera when the pack shutter is open, inasmuch as such removal would spoil the photosensitive element. For this purpose, the annulus 78 on the outer face of the head 3 is recessed, as at 93, and the bail-like locking member 31, which is utilized to secure the head 3 to the casing 2, has one of its arms bent inwardly, as at 94, providing a tongue or finger portion projecting into the recess 93, as shown in Figure 3. In this view, the shutter-actuating instrumentalities are shown in the position assumed by these elements when the pack shutter is closed. That is to say, the extension 83 on the flange 82 of the rotatable cup-shaped member 81 is against the limit stop 80. In opening the pack shutter, the cup-shaped member 81 is rotated in a counter-clockwise direction, as viewed in Figure 3, until the extension 83 engages the limit stop 79. When so engaged, the extension 83 lies over the finger or tongue 94, previously described, thereby preventing the bail-like member 31 from being swung rearwardly towards the position which it must assume to release the arms 35 from the pins 34 for the purpose of releasing the head 3 to permit removal of the same from the casing 2. This interlocking action constitutes a safety feature, tending to minimize spoilage of the photosensitive elements of the film packs.

The head 3 is also preferably provided with inwardly projecting lugs 95, preferably formed integrally with the flange 29, which lugs are adapted to lie over the rearwardly-turned end 25 of the bail-like member 23 at the rear end of the pack storage chamber 21. These lugs insure that the member 23, and particularly the portion 25, will not interfere with the rectilinear movement of the pack shutter actuating pin 89 as it approaches the end of its movement in withdrawing or opening the pack shutter. Therefore, the member 23 must be swung inwardly into the casing 2 and within the insert 18 which forms the storage compartment, before the head 3 can be fitted onto the end of the casing 2. Figure 2 shows the position which the member 23 must assume to permit application of the head 3 to the casing 2. The plate 56 is cut away, at 96, as by widening the slot 91 adjacent the slotted end of the plate, whereby to provide sufficient clearance for permitting the plate 56 to fit within the confines of the flange 29 of the head 3. The plate 56 is also notched, as at 97, to clear the lugs 92. There is also sufficient clearance between the side edges of the plate 56 and the inner faces of the flange 29 to permit the sliding movement of the clips 58 which have been previously described.

*Operation*

Let it be assumed that the camera has been assembled and it is desired to load the same with a picture pack so that a picture may be taken, and let it be assumed that one or more picture packs 6 are stored in the storage compartment 21, as illustrated in Figure 2. The first operation is to remove the head 3 to give access to the stored packs in the compartment 21. In order to remove the head 3, the finger may be inserted under the tongue or finger piece 38 of the bail-like member 31, and this member 31 swung rearwardly about the arms 32 as a pivotal axis, thereby releasing the arms 35 from engagement with the pins 34 on the casing 2. The initial rearward pressure of the finger on the tongue 38 springs the member 37 out of the groove 36, whereupon further swinging movement of the member 31 may be freely attained. When the arms 35 have been sufficiently disengaged from the pins 34, the head 3 may be removed from the casing 2 and temporarily set aside. Thereupon, the ball-like member 23 which normally lies across the rear end of the storage compartment 21 may be swung in a clockwise direction, as viewed in Figure 2, about 24 as the pivot, permitting removal of one of the stored packs 6. When the desired pack has been taken out of the storage compartment 21, the member 23 is returned by a swinging movement to its initial position shown in Figure 2, thereby preventing any other packs which may be in this chamber, from becoming inadvertently displaced or jarred out of the casing.

It now remains to mount the pack, which was removed from the storage compartment, in the head 3. Preliminary to this mounting operation, care should be taken that the pack shutter actuating instrumentalities are in the position shown in Figures 5 and 6, which is the closed-shutter position, before attempting to mount the picture pack in the head. Also, the clips 58 should be disposed in a shifted position towards the righthand end of the head, as viewed in Figures 5 and 6, the slots 62 in the plate 56 through which the laterally extending tongues 61 extend, permitting this shifting movement of the clips. The head is now conditioned for receiving the picture pack. Insertion of the pack can be best accomplished with the head inverted, that is, by holding the head with its inner face uppermost. While so held, the rear edge of the pack 6 may be inserted in the channel formed by the flange 57 on the plate 56, and the front edge of the pack swung downwardly against the plate 56 so as to lie flat thereon. As the pack is thus inserted, the staple or tongue 90 on the forward end of the pack shutter will drop over and engage about the shutter-actuating pin 89, as illustrated in dotted lines in Figures 5 and 6. Thereupon, the clips 58 may be shifted towards the pack 6 so that the tongues or fingers 59 extend over or beyond the forward edge of the pack, as illustrated particularly in these same Figures 5 and 6. The pack is now firmly held on the plate 56, and will not drop out or become accidentally displaced, irrespective of handling of the head alone or after it is applied to the casing 2. The next step to be performed is to remount the head on the casing 2, and in accomplishing this, the flange 29 is telescoped within the open end of the casing 2 until the body 28 abuts against the marginal edges of the casing 2 at its open end. In so applying the head to the casing, care should be exercised to the end that the picture pack 6 will be disposed in register with the light passage 20, that is, directly opposite the lens 9 and light opening 5 at the front end of the camera. If the head is mounted in its correct position, the latching arms 35 will engage the pins 34 when the ball-like member 31 is swung towards the position illustrated in Figures 2 and 3. As the member 31 approaches this position, the portion 37 of the member 31 will snap into the groove 36 by exerting a pressure against the finger piece 38 to force the same towards the casing so that the ball-like member 31 lies substantially flat thereagainst. When so latched, the arms 35 are tensioned slightly against the pins 34, thereby holding the head 3 firmly secured to the casing in a light-tight condition.

The pack shutter may now be opened or withdrawn from the pack to uncover the photosensitive element in the pack without any danger of spoiling the photosensitive element, inasmuch as the pack is fully enclosed in a light-tight chamber within the camera. To open the pack shutter, the cup-shaped member 81 is rotated, through means of the handle or finger piece 84, in a counter-clockwise direction, as viewed in Figure 3, until the extension 83 abuts the stop 79. In this position, the extension 83 lies over the tongue or finger 94 of the ball-like fastening member 31, thereby preventing the head 3 from being removed from the camera so long as the pack shutter is open. During this rotation of the member 81 as just described, the planetary gear wheel 87 and the pin 89 carried thereby move rectilinearly to their dotted line positions illustrated in Figure 6, drawing the pack shutter towards this end of the head through means of the interengagement of the pin 89 with the staple or tab 90 which is fixed to the front edge of the shutter. As the pack shutter is opened or withdrawn from the pack, the stop shoulders 92 prevent the pack and the photo-sensitive element forming a part thereof, from moving with the shutter.

The only operation now required for completing the conditioning of the camera for taking a picture is to focus the camera. This focusing operation is accomplished by rotating the cam member 40 through means of the finger pieces 46 which project through the openings 47 in the rear face of the extension 30 on the head, until one of the finger pieces 46 coincides with the adjacent indicia 75 corresponding to the proper focal adjustment for the distance the subject is away from the camera. This focusing operation may be performed either before or after the pack shutter is opened through the adjustment of the shutter-actuating instrumentalities as previously described. It is therefore to be understood that I do not wish to be limited to the precise order of these operations as just set forth.

In focusing the camera, the picture pack carrying plate 56 is shifted towards or away from the lens 9, according to which direction the cam member 40 is rotated. The plate and pack move bodily and always remain respectively in planes at right angles to the axis of the light beam permitted to enter the camera under the control of the timing shutter 10 and diaphragm 11, irrespective of the particular focal adjustment selected.

Upon completion of the operations just described, the camera is ready to be used for taking a picture, and the exposure of the photosensitive element to photographically record an image of the subject thereon may be carried out in the conventional manner, as should be readily understood without further detailed description. After the exposure step, the pack shutter is returned to closed position masking the exposed photosensitive element of the pack, by rotating the member 81 clockwise, as viewed in Figure 3, until the extension 83 engages the stop 80. The head 3 may now be safely released from the camera for removal of and development of the pack through means of my developing apparatus of my copending application hereinbefore referred to, or through means of any other suitable developing devices. To release the pack from the head, the clips 58 are shifted along the plate 56 so as to withdraw the fingers 59 away from the pack. Thereupon, the pack may be lifted out of the head by the fingers, or by inverting the head over the hand, in which latter case, the pack will generally fall out of its own accord. Reloading of the camera with a fresh or unexposed pack may be accomplished in the same manner as just described.

It will be observed that very nearly all of the parts of the focusing mechanism and of the pack shutter actuating mechanism may be formed from comparatively simple metal stampings, thereby materially contributing to the low cost of manufacture of these parts. As previously mentioned, the head 3 is preferably made of a relatively inexpensive composition, such as "Bakelite", which may be readily cast or molded into the desired form for accommodating the instrumentalities adapted to be mounted therein. Very little, if any, machining or drilling of the head is required. The cavity in the protuberant extension 30, into which the cam member 40 is received, and the grooves 74 in the walls of this cavity, which grooves receive the links 68 to prevent the latter from shifting laterally and serve to guide the same in their axial movement resulting from rotation of the cam member, are all preferably formed as the head is molded. Likewise, the bore 77 is formed during molding of the head, and the series of pins or studs 88, and the various lugs such as 80, 92, 95, etc., preferably are formed integrally with the head. Consequently, the entire camera may be manufactured at a relatively low cost, while at the same time providing a very compact unit having many features which are very desirable in a camera, yet which have not been heretofore obtainable, especially in cameras of the less expensive type.

Although I have described and illustrated in my present application a camera construction of the so-called "box" type, it is to be understood that certain of the novel features thereof are equally applicable to folding or collapsible cameras. For example, these folding or collapsible cameras could be fitted with a head generally similar to the pack-mounting head disclosed herein and embodying similar focusing instrumentalities and/or shutter-actuating instrumentalities, thereby making these cameras applicable to use with my improved type of picture packs.

While the specific details have been herein shown and described, the invention is not confined thereto, as changes and alterations may be made without departing from the spirit thereof as defined by the appended claims.

What I claim as new and desire to secure by Letters Patent is—

1. A device for taking photographic pictures, comprising a hollow body having a lens mounted at one end and a shutter associated with said lens, and means at the opposite end of said body for mounting a photosensitive element in a position so as to be acted upon by light admitted into the body through the lens under the control of the said shutter, said means including a head releasably secured to the body and forming a closure therefor and having means adapted to receive the photosensitive element so as to be releasably held in operative relation to the lens for photographically recording an image of the subject on the photosensitive element.

2. A device for taking photographic pictures, comprising a hollow body having a lens mounted at one end and a shutter associated with said lens, and means at the opposite end of said body for mounting a photosensitive element in a position so as to be acted upon by light admitted into the body through the lens under the control of the said shutter, said means including a head releasably secured to the body and having means for engaging about one edge of the photosensitive element, and a slidable member on said head having a tongue projecting therefrom so as to be engageable over an opposite edge of said photosensitive element.

3. A device for taking photographic pictures, comprising a hollow body having a lens mounted at one end and a shutter associated with said lens, and means at the opposite end of said body for mounting a photosensitive element in a position so as to be acted upon by light admitted into the body through the lens under the control of the said shutter, said means including a head releasably secured to the body and having means for engaging about one edge of the photosensitive element, and a pair of slidable members on said head, each having a tongue projecting therefrom so as to be engagable over an opposite edge of said photosensitive element adjacent to the ends of the latter.

4. A device for taking photographic pictures, including a hollow body having a lens mounted at one end and a shutter associated with said lens, and means at the opposite end of said body for mounting a photosensitive element in a position so as to be acted upon by light admitted into the body through the lens under the control of the said shutter, in combination with mechanical instrumentalities on the body for selectively moving the photosensitive element towards and away from the lens, whereby to focus the image on said photosensitive element, said mechanical instrumentalities including a rotatable cam member operatively connected with the mounting means for the photosensitive element.

5. A device for taking photographic pictures, including a hollow body having a lens mounted at one end, a shutter associated with said lens, and a head detachably secured to the opposite end of said body and having a photosensitive element holder movably mounted therein for mounting a photosensitive element on the head in a position so as to be acted upon by light admitted into the body through the lens under the control of said shutter, in combination with mechanical instrumentalities on the head for selectively moving said photosensitive element towards and away from the lens, whereby to focus the image on the photosensitive element, said mechanical instrumentalities including a cup-shaped cam member rotatably mounted within the head and having means extending through the face of the head for manipulating the same, said cam member having a plurality of inclined cam slots in the annular wall thereof, links interconnecting the cam member with the photosensitive element holder, one end of each link engaging in one of the cam slots aforesaid, and a spring interposed between the cam member and the holder and normally urging the holder away from the cam member.

6. A device for taking photographic pictures, including a hollow body having a lens mounted at one end, a shutter associated with said lens, and a head detachably secured to the opposite end of said body and having a photosensitive element holder movably mounted therein for mounting a photosensitive element on the head in a position so as to be acted upon by light admitted into the body through the lens under the control of said shutter, in combination with mechanical instrumentalities on the head for selectively moving said photosensitive element towards and away from the lens, whereby to focus the image on the photosensitive element, said mechanical instrumentalities including a cup-shaped cam member rotatably mounted within the head and having means extending through the face of the head for manipulating the same, said cam member having a plurality of inclined cam slots in the annular wall thereof, links interconnecting the cam member with the photosensitive element holder, one end of each link engaging in one of the cam slots aforesaid, a spring interposed between the cam member and the holder and normally urging the holder away from the cam member, and a second cup-shaped member mounted in fixed relation to the head within the cup-shaped cam member and coaxial therewith, said second cup-shaped member being interposed between the spring and the cam member and substantially housing the spring.

7. A device for taking photographic pictures, including a hollow body having a lens mounted at one end, a shutter associated with said lens, and a head detachably secured to the opposite end of said body and having a photosensitive element holder movably mounted therein for mounting a photosensitive element on the head in a position so as to be acted upon by light admitted into the body through the lens under the control of said shutter, in combination with mechanical instrumentalities on the head for selectively moving said photosensitive element towards and away from the lens, whereby to focus the image on the photo-sensitive element, said mechanical instrumentalities including a cup-shaped cam member rotatably mounted within the head and having means extending through the face of the head for manipulating the same, said cam member having a plurality of inclined cam slots in the annular wall thereof, links interconnecting the cam member with the photosensitive element holder, one end of each link engaging in one of the cam slots aforesaid, a spring interposed between the cam member and the holder and normally urging the holder away from the cam member, a second cup-shaped member mounted in fixed relation to the head within the cup-shaped cam member and coaxial therewith, said second cup-shaped member being interposed between the spring and the cam member and substantially housing the spring, and a resilient pressure plate interposed between the cup-shaped members.

8. The combination with a camera body having a lens mounted at one end and a shutter associated with said lens, of a removable head detachably secured to said body, a plate shiftably mounted within the head towards and away from the face of said head, said plate having means thereon for removably securing a photosensitive element thereto, said head having a recess therein behind said plate, a cup-shaped cam member rotatably mounted within the recess and having means extending through the face of the head for manipulating the same, said cam member having a plurality of inclined cam slots in the annular wall thereof, links interconnecting the cam member with said plate, one end of each link engaging in one of the cam slots, and the other end of each link extending through said plate and bent over against the face of the plate, and a spring interposed between the cam member and the plate for normally urging said plate and the photosensitive element carried thereby away from said cam member, whereby rotation of the cam member in one direction produces a shifting movement of the plate in one direction normal to the plane of rotation of the cam member, and rotation of the cam member in the opposite direction produces a shifting movement of the plate in the opposite direction.

9. The combination with a camera body having a lens mounted at one end and a shutter associated with said lens, of a removable head detachably secured to said body, a plate shiftably mounted within the head towards and away from the face of said head, said plate having means thereon for removably securing a photosensitive element thereto, said head having a recess therein behind said plate and a boss projecting from the inner face of said head into said recess and coaxially disposed relative to said recess, a cup-shaped cam member rotatably mounted within said recess and having an opening through its end face through which the boss extends, the annular wall of said cam member having a plurality of inclined cam slots therein, a second cup-shaped member concentrically mounted within the recess and within the cup-shaped cam member and having its annular wall radially spaced from the annular wall of the cam member, means for fixedly securing said second cup-shaped cam member in abutting engagement with the free end of the boss, a resilient pressure plate extending about the boss and interposed between the cup-shaped members aforesaid, a carrier plate disposed adjacent said cup-shaped members, means interconnecting the carrier plate with the cam member, said means engaging in the inclined cam slots of the cam member, a coil spring interposed between the second cup-shaped member and the carrier plate, one end of the coil spring abutting against the rear face of the plate, and the opposite end of the coil spring seating within the second mentioned cup-shaped member, and means on said carrier plate for releasably securing a photosensitive element thereto, whereby rotation of the cam member in one direction effects movement of the carrier plate and photosensitive element towards the lens aforesaid, and rotation in the opposite direction effects movement thereof away from the lens.

10. Focusing mechanism for cameras, comprising a carrier plate having provision for removably receiving a photosensitive element to be held thereby while photographically recording an image thereon, a cup-shaped cam member associated with said carrier plate and having a plurality of inclined cam slots formed in the annular wall thereof, a plurality of links interconnecting the cam member with the carrier plate, said links being arranged in circumferentially spaced relation about the cam member and having their ends inwardly bent to extend into the cam slots, there being one link for each slot, and a spring interposed between the cam member and the carrier plate.

11. Focusing mechanism for cameras, comprising a carrier plate having provision for removably receiving a photo-sensitive element to be held thereby while photographically recording an image thereon, a cup-shaped cam member associated with said carrier plate and having a plurality of inclined cam slots formed in the annular wall thereof, a plurality of links interconnecting the cam member with the carrier plate, said links being arranged in circumferentially spaced relation about the cam member and having their ends inwardly bent to extend into the cam slots, there being one link for each slot, a second cup-shaped member concentrically mounted within the cup-shaped cam member and adapted to be fixedly secured to the camera, a pressure plate interposed between said cup-shaped members, and a spring interposed between the second mentioned cup-shaped member and the carrier plate.

12. Focusing mechanism for cameras, comprising a carrier plate having provision for removably receiving a photo-sensitive element to be held thereby while photographically recording an image thereon, a cup-shaped cam member associated with said carrier plate and having a plurality of inclined cam slots formed in the annular wall thereof, a plurality of links interconnecting the cam member with the carrier plate, said links being arranged in circumferentially spaced relation about the cam member, there being one link for each slot, a second cup-shaped member concentrically mounted within the cup-shaped cam member and adapted to be fixedly secured to the camera, a pressure plate interposed between said cup-shaped members, said pressure plate having substantially the form of a circular disc bent on its diameter to form angularly disposed wings engaging the inner end face of the cam member at their edges, and a spring interposed between the second cup-shaped member and the carrier plate.

13. A carrier for mounting picture packs in cameras, comprising a plate having a flange at one end bent over to form a substantially U-shaped shallow channel adapted to receive one edge of the picture pack, and clip members slidably mounted on the plate at opposite sides thereof for engaging the picture pack at its edge opposite to the edge received in the channel aforesaid, said clip members including fingers disposed in spaced relation to the plate and adapted to extend over the edge of the picture pack adjacent its opposite ends.

14. In a camera adapted for use with picture packs of the type including a casing having a photosensitive element mounted therein, and a shutter movable to and from a position across said photosensitive element, a hollow body having a lens at one end, a shutter associated with said lens, means at the opposite end of said body for supporting the picture pack in operative relation to the lens, and mechanical instrumentalities on said picture pack supporting means for actuating the picture pack shutter to and from a position across the photosensitive element as aforesaid.

15. In a camera adapted for use with picture packs of the type including a casing having a photosensitive element mounted therein, and a shutter movable to and from a position across said photosensitive element, a hollow body having a lens at one end and a shutter associated with said lens, means at the opposite end of said body for supporting the picture pack in operative relation to the lens, mechanical instrumentalities on said picture pack supporting means for actuating the picture pack shutter to and from a position across the photosensitive element as aforesaid, and means for moving said picture pack supporting means towards and away from said lens independently of the picture pack shutter actuation, whereby to focus the image of the subject to be photographed on said photosensitive element.

16. In a camera adapted for use with picture packs of the type including a casing having a photosensitive element mounted therein, and a shutter movable to and from a position across said photosensitive element, a hollow body having a lens at one end and a shutter associated with said lens, means at the opposite end of said body for supporting the picture pack in operative relation to the lens, mechanical instrumentalities on said picture pack supporting means for actuating the picture pack shutter to and from a position across the photosensitive element as aforesaid, and means for holding said picture pack against displacement while the picture pack shutter is being actuated.

HERMAN CASLER.